United States Patent Office.

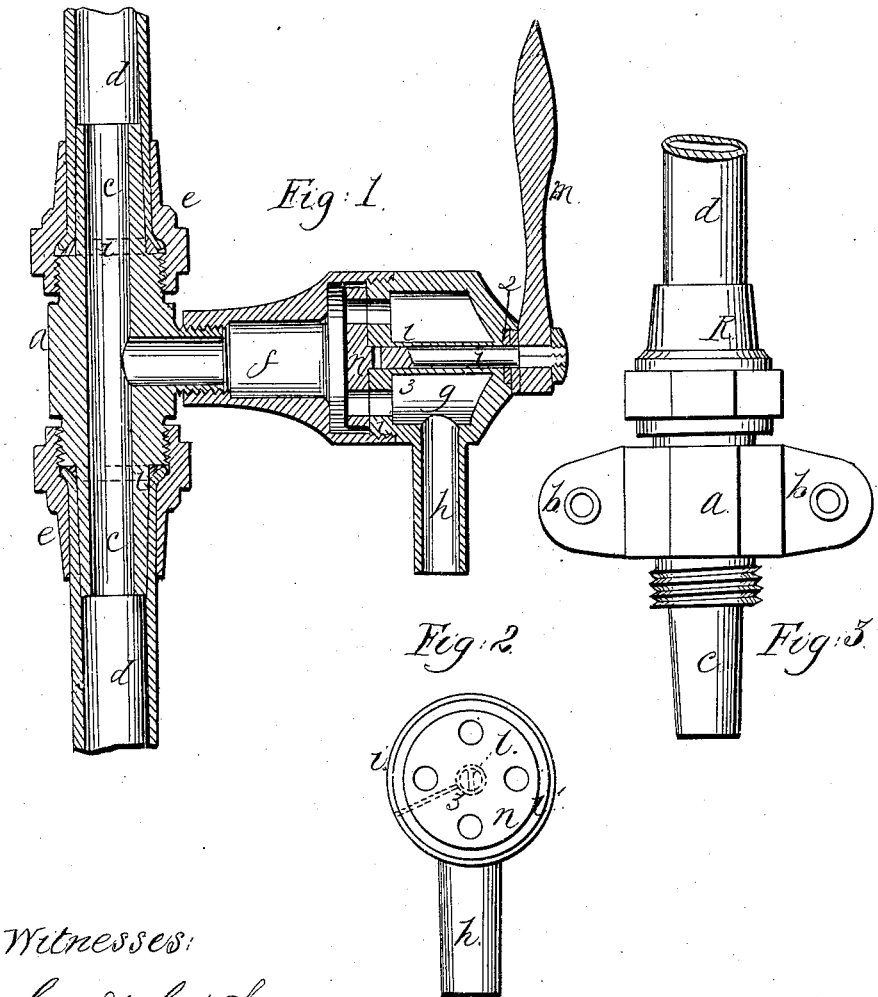

JOHN LAING, OF HOBOKEN, NEW JERSEY, ASSIGNOR TO HIMSELF AND GEORGE NIMMO.

*Letters Patent No. 65,238, dated May 28, 1867.*

---

IMPROVEMENT IN FAUCETS.

---

*The Schedule referred to in these Letters Patent and making part of the same.*

---

TO ALL WHOM IT MAY CONCERN:

Be it known that I, JOHN LAING, of Hoboken, in the county of Hudson, and State of New Jersey, have invented, made, and applied to use a certain new and useful Improvement in Faucets; and I do hereby declare the following to be a full, clear, and exact description of the said invention, reference being had to the annexed drawing, making part of this specification, wherein—

Figure 1 is a vertical section of my said faucet.

Figure 2 is a rear view of the disk-valve; and

Figure 3 is an elevation of the coupling and stock for the faucet.

Similar marks of reference denote the same parts.

Faucets have heretofore been made with a disk having a hole for the liquid to pass through when said disk is turned so that said hole coincides with a hole in its seat.

The nature of my said invention consists in a faucet formed with a pipe extending from the seat of the disk-valve across the water-way, and receiving the spindle of the valve so that the valve itself prevents leakage at the spindle, and thereby the packing heretofore employed around the spindle is dispensed with. I also connect the soft metal pipe with the cock by clamping it between a tapering plug passing into the pipe and a tapering coupling screwing upon the base of the plug and clamping the pipe between two smooth or nearly smooth surfaces. By this construction the cock can be removed from its stock to give access to the valve, and the soldering of the lead pipe to the cock is dispensed with, thus insuring a much handsomer union of the soft metal pipe with the faucet, and allowing for the easy disconnection of the same when required.

In the drawing, $a$ is the metal stock uniting the faucet and the soft metal pipe. This stock may be made single or as a T, in the manner shown, so that the faucet projects from the side of the pipe. This stock is to be held firmly in place by suitable means. I prefer to have flanges projecting from the sides thereof to receive screws, as shown at $b$, fig. 3. The water pipe $d$ is swelled slightly to set over the tapering plug $c$ of the stock $a$, and $e$ is a coupling fitting the outside of the soft metal pipe $d$, and, screwing upon the base of the plug $c$, compresses firmly the tapering portion of said pipe $d$ upon the taper plug $c$, insuring a tight connection, and the end of the pipe $d$ may be flaring to set upon the conical ring $i$ to insure greater firmness in the connection of the pipe $d$ and plug $c$. Upon the stock $a$ the chamber $f$ of the faucet is screwed, and to that is screwed the valve-seat $i'$, from which extends the water-way or chamber $g$ with its bib or delivery pipe $h$. $l$ is the spindle of the disk-valve $n$, said spindle passing through a pipe that is formed across the water-way $g$ from the centre of the seat $i$, and the disk-valve sets upon the seat $i'$, and is kept thereto by the pressure of the liquid, and has two or more holes corresponding with holes in the seats to allow the passage of the liquid when the disk $n$ is turned for said holes to coincide, or to shut off the flow of liquid when said holes do not coincide. The spindle $l$ is packed at 2 with an elastic washer that keeps the valve to its seat, and the handle $m$ is used to turn said valve.

When this faucet is placed so that the valve-spindle $l$ stands vertically, it may be employed in a hydrant, the pipe $h$ being led off vertically. In this case an opening is required for allowing the water to subside in the delivery pipe, to effect which the spindle $l$ may be formed like the plug of a cock, as at 3, to open through a hole in the seat, (see dotted lines, fig. 2,) when the valve $n$ is closed, and allow the water in $g$ and $h$ to run away, and the turning of this spindle $l$ to open the valve $n$ closes this waste-hole.

This faucet may be employed with steam, water, or any fluid or liquid, and if the handle $m$ is extended and provided with a float, it may be used as a ball-cock.

What I claim, and desire to secure by Letters Patent, is—

A faucet formed with a pipe extending from the seat $i'$ of the disk-valve $n$, across the water-way $g$, and receiving the spindle $i$ of said valve, as and for the purposes set forth.

In witness whereof I have hereunto set my signature this sixth day of February, A. D. 1867.

JOHN LAING.

Witnesses:
GEO. D. WALKER,
CHAS. H. SMITH.